United States Patent [19]

Ishii et al.

[11] Patent Number: 4,553,821
[45] Date of Patent: Nov. 19, 1985

[54] LIQUID CRYSTAL DISPLAY DEVICES

[75] Inventors: Yutaka Ishii, Nara; Fumiaki Funada, Yamatokoriyama; Toshiaki Takamatsu, Tenri; Wada Tomio, Nara, all of Japan

[73] Assignee: Sharp Kabushiki Kaisha, Osaka, Japan

[21] Appl. No.: 233,289

[22] Filed: Feb. 10, 1985

[30] Foreign Application Priority Data

Feb. 29, 1980 [JP] Japan ................................. 55-25914

[51] Int. Cl.[4] .............................................. G02F 1/135
[52] U.S. Cl. ................... 350/339 R; 350/350 R
[58] Field of Search ........... 350/333, 340, 341, 350 R; 252/299.2

[56] References Cited

U.S. PATENT DOCUMENTS

| | | | |
|---|---|---|---|
| 3,700,306 | 10/1972 | Cartmell et al. | |
| 3,749,474 | 7/1973 | Cartmell | 252/299.2 X |
| 3,888,566 | 6/1975 | Toriyama et al. | 252/299.2 |
| 3,920,576 | 11/1975 | Jones et al. | 350/350 R |
| 3,950,264 | 4/1976 | Jones | 252/299.2 |
| 4,083,099 | 4/1978 | Yano et al. | 350/341 |
| 4,151,326 | 4/1979 | Funada et al. | 252/299.4 |
| 4,155,872 | 5/1979 | Shigehiro et al. | 350/350 R X |
| 4,291,949 | 9/1981 | Wada et al. | 350/340 X |

FOREIGN PATENT DOCUMENTS 2418022 4/1974 Fed. Rep. of Germany .

OTHER PUBLICATIONS

Uchida et al., "A Display Device Using Depolarization in Twisted Nematic Liquid Crystal Layer", *IEEE Transactions on Electron Devices*, vol. ED-24, No. 4, IEEE, Sep. 1979.

Fukuda et al., "Two Frequency Addressing of a DTN--Cell", Mol. Cryst. Liq. Cryst. 1981, vol. 68, pp. 311–330.

*Primary Examiner*—John K. Corbin
*Assistant Examiner*—David Lewis
*Attorney, Agent, or Firm*—Stiefel, Gross, Kurland & Pavane

[57] ABSTRACT

There discloses a liquid-crystal display device which is effective for the display of images particularly in a TV set and in which the liquid-crystal layer contains a dopant in a specific range of quantity and insulating layer is treated with an alkoxysilane coupling agent containing a glycidoxy group.

14 Claims, 2 Drawing Figures

LIQUID CRYSTAL DISPLAY DEVICES

BACKGROUND OF THE INVENTION

1. Field of the Invention

This invention relates to a liquid crystal display device, and more particularly, to a liquid crystal display device comprising a dynamic scattering liquid crystal cell formed by a nematic or long-pitched cholesteric crystal oriented in a twisted pattern between a pair of substrates carrying transparent electrodes thereon, and polarizers.

2. Description of the Prior Art

Display devices employing liquid crystals have of late been put to practical use at a fast rate. Above all, reserach and development work is actively under way for matrix liquid crystal display devices because of the diversified possibilities of their application. Portable electronic calculators are beginning to be available on the market.

There are known a number of types of matrix liquid crystal display devices, including TN (twisted nematic), DAP type utilizing variation in the rate of double refraction, DS (dynamic scattering) type utilizing the effect of light scattering, and Ch-N (cholesteric-nematic) phase transition type. TN and DAP type liquid crystal display devices, which utilize the double refraction of a liquid crystal, provide a disadvantageously narrow viewing angle. While the viewing angle is not so strictly restricted in DS or phase transition type devices, they disadvantageously fail to maintain a visible display when viewed along the axis of a light source. Anyway, none of these types is considered to constitute a very satisfactory matrix display device. There has, therefore, been proposed recently a DTN (depolarization in twisted-nematic) cell device comprising a pair of polarizers, a DS cell composed of a nematic or long-pitched cholesteric liquid crystal twisted at an angle of 90°, and a diffuser.

A display device employing a DTN cell utilizes the depolarization of light by a DS cell upon application of voltage thereto. It is reported that this device can provide a sharper rise in contrast in the vicinity of a threshold voltage, and a much wider viewing angle than a device employing TN cell, and is suitable as a matrix display device having a large number of scanning electrodes (Tatsuo Uchida, Yutaka Ishii and Masanobu Wada: "Properties of a Display Device Using Depolarization in a Twisted Nematic Liquid-Crystal Layer", Proceedings of the SID, Vol. 21/2, 1980, pages 55 to 61).

If a matrix display device employing a DTN cell is used for displaying an image signal, such as a TV picture, using a driving voltage of which the waveform does not only contain a low frequency, but also a considerably high frequency component, it is necessary to raise the cut-off frequency of the liquid crystal composition to a considerably higher level than the high frequency component in the driving voltage, without impairing the response of the low frequency component to the voltage.

In view of these problems, the inventors of this invention have found it useful to incorporate a specific quantity of dopant into a liquid crystal layer, and to apply a specific agent for molecular orientation to an insulating layer. As a result, they have succeeded in obtaining a liquid crystal display device which constitutes this invention, and is suitable for the display of an image signal.

SUMMARY OF THE INVENTION

According to this invention, there is provided a novel and useful matrix liquid crystal display device employing a DTN cell, which is realized by incorporating the technology for substrate surface treatment ensuring the orientation of liquid crystal molecules which is suitable for a highly reliable and excellent display of a TV, or other image with a wide frequency distribution from a low to a high frequency.

More specifically, this invention provides in a liquid crystal display device comprising a pair of transparent substrates defining a pair of mutually facing surfaces, a transparent electrode assembly provided on each of the mutually facing surfaces of the substrates, an insulating layer covering each electrode assembly, a DTN liquid crystal layer disposed between the mutually facing insulating layers, and a polarizer provided on the opposite surface of each substrate from the liquid crystal layer, the improvement wherein the liquid crystal layer contains a dopant to the extent that the cut-off frequency $f_c$ (Hz) of the liquid crystal layer against the dynamic scattering effect satisfies the following relationship within a range of ambient temperatures:

$$16 \cdot C/C_o \cdot N \cdot F \gtrsim f_c \gtrsim 8 \cdot N \cdot F$$

in which N stands for the number of multiplex driving (hence, 1/N being the duty ratio), F stands for the frame frequency of an image signal, C stands for the capacitance per unit area of the insulating layers, and $C_o$ stands for the capacitance per unit area of the insulating layers when they have a specific dielectric constant $\epsilon$ of about 4, and a thickness of about 100 Å; and wherein the insulating layers are treated with an alkoxysilane coupling agent containing a glycidoxy group.

DETAILED DESCRIPTION OF THE PREFERRED EMBODIMENT

Figure 1:
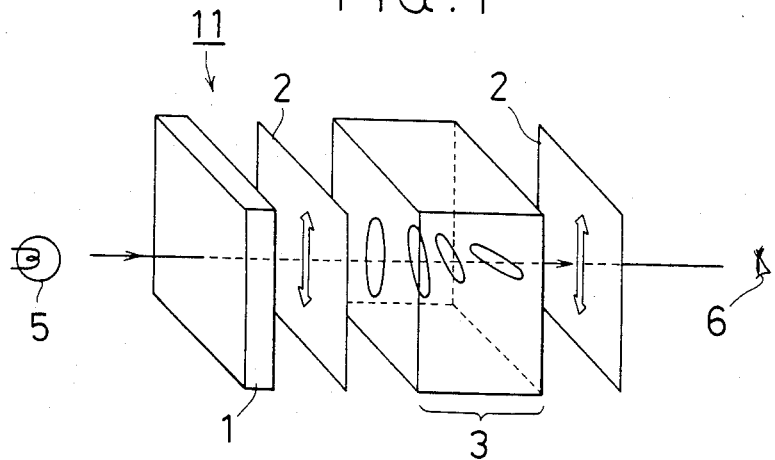
FIG. 1 is a schematic view of the liquid crystal display device embodying this invention, and employing a DTN system.
Figure 2:
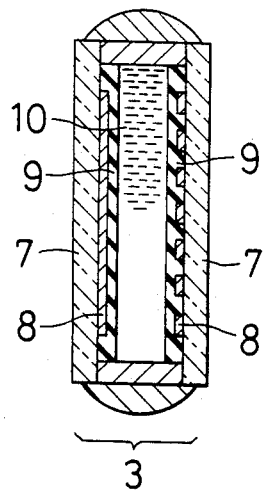
FIG. 2 is a cross-sectional view of the DS cell shown in FIG. 1.

Referring first to FIG. 1, a preferred liquid crystal display device according to this invention is generally designated by the reference numeral 11. The device 11 comprises a light diffuser 1, a pair of polarizers 2, and a dynamic-scattering liquid crystal cell (DS cell) of the twisted-nematic orientation 3. As shown in FIG. 2, the DS cell 3 comprises a pair of transparent substrates 7, a matrix transparent electrode assembly 8, a pair of insulating layers 9 treated with an agent for orientation of the liquid crystal molecules, and a liquid crystal layer 10 formed by a liquid crystal composition containing a dopant. Referring to FIG. 1 again, numeral 5 denotes an illumination device, and numeral 6 indicates a viewer.

The construction of the liquid crystal display device according to this invention is, however, not limited to the one as hereinabove described. The device permits various modifications if it essentially comprises a liquid crystal layer of the DTN type sandwiched between a pair of transparent substrates defining a pair of mutually facing surfaces each carrying thereon a transparent electrode assembly and an insulating layer treated for the orientation of liquid crystal molecules, and a polarizer provided on the opposite surface of each substrate from the liquid crystal layer, and is adapted for use in the matrix display of, for example, a TV picture.

Each transparent substrate 7 may usually comprise a glass, plastic, or like plate known in the art. Each transparent electrode assembly 8 may be formed by an ITO film (consisting mainly of $In_2O_3$) having a thickness of 300 to 500 Å, a NESA film (consisting mainly of $SnO_2$), or the like, known in the art. The light diffuser 1, polarizers 2 and illumination device 5 may also be selected from among those known in the art.

Attention is now directed to the principal features of this invention. Referring first to the liquid crystal layer 10, it is characterized by the quantity of the dopant present therein. The liquid crystal layer 10 contains a larger quantity of dopant than the liquid crystal layer in any known DS cell. This feature makes it possible to an improved orientation of liquid crystal molecules which is particularly suitable for the display of a TV picture, or the like.

As is generally known, the driving frequency $f_d$ for a liquid crystal display device utilizing the DS effect must not be higher than the cut-off frequency $f_c$ at which the threshold voltage for the DS effect becomes infinitely high. This relationship can be expressed as follows:

$$k_1 \cdot f_d \lesssim f_c \tag{1}$$

in which $k_1$ is greater than 1.

The driving frequency $f_d$ for the liquid crystal display device 11 can basically be expressed as follows:

$$f_d = F \cdot N \tag{2}$$

in which F stands for the frame frequency of an image signal, and N stands for the number of multiplexing of the device. Accordingly, the expression (1) can be rewritten as follows:

$$k_1 \cdot F \cdot N \lesssim f_c \tag{3}$$

The expression (3) shows that the cut-off frequency $f_c$ for the liquid crystal display device 11 has a certain lower limit.

When the cut-off frequency $f_c$ is sufficiently higher than the driving frequency $f_d$, the DS cell 3 can electrically be defined as a serial equivalent circuit comprising the capacitance C formed by the insulating layers 9 and the resistance R formed by the liquid crystal layer 10. The voltage V actually applied to the liquid crystal layer 10 is:

$$V = \frac{E}{\sqrt{1 + \left(\frac{1}{2\pi f_d CR}\right)^2}} \tag{4}$$

in which E stands for source voltage.

In order to obtain the voltage V required for application to the liquid crystal layer when the source voltage E is maintained constant, the following relationship must be maintained:

$$1/2\pi f_d CR \lesssim k_2 \tag{5}$$

As is well known, $$1/R = k_3 \cdot \sigma \tag{6}$$

and $$f_c = k_4 \cdot \sigma \tag{7}$$

In view of the expression (2) taken with the expressions (6) and (7), the expression (5) can be rewritten as follows:

$$f_c \lesssim k_5 \cdot F \cdot N \cdot C \tag{8}$$

in which $k_5 = 2/\pi k_2 k_4/k_3$. \tag{8}

The expression (8) shows that the cut-off frequency $f_c$ for the liquid crystal display device 11 has a certain upper limit, too.

The inventors of this invention have prepared a lot of liquid crystal display devices containing different quantities of dopant in their liquid crystal layers, and conducted a lot of experiments for the display of images. As a result, they have discovered that an image which is satisfactory in contrast and halftone can be produced if the dopant is incorporated in the quantity corresponding to the cut-off frequency $f_c$ which satisfies the expression (3) when $k_1$ is 8, and the expression (8) when $k_5$ is equal to $16/C_o$ in which $C_o$ stands for the capacitance per unit area of the insulating layers when they have a specific dielectric constant $\epsilon$ of about 4, and a thickness of about 100 Å.

In order to provide a satisfactory image display, therefore, the liquid crystal display device 11 of this invention contains the dopant corresponding to the cut-off frequency $f_c$ which satisfies the following relationship:

$$16/C_o \cdot C \cdot F \cdot N \gtrsim f_c \gtrsim 8 \cdot N \cdot F \tag{9}$$

The quantity of the dopant thus defined is at least about 10 times larger than that which has hitherto been employed.

The liquid crystal layer into which the dopant is incorporated may be composed of a nematic or long-pitched cholesteric liquid crystal which is usually employed in a DS cell. It is particularly suitable to use a nematic liquid crystal of negative dielectric anisotropy. Examples of such liquid crystal material include the following:

(a) 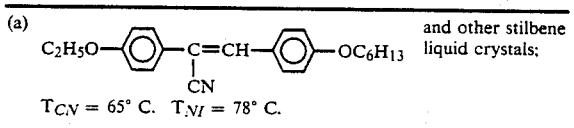 and other stilbene liquid crystals;

(b) 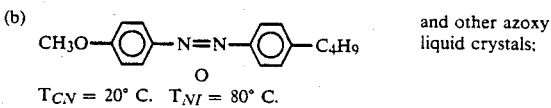 and other azoxy liquid crystals;

(c) 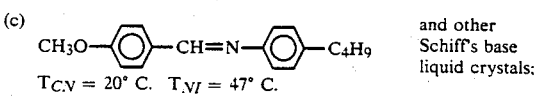 and other Schiff's base liquid crystals;

(d) 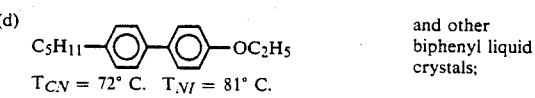 and other biphenyl liquid crystals;

-continued (e) CH₃O—⟨◯⟩—CO—⟨◯⟩—C₅H₁₁   and other ester liquid crystals;
         ‖
         O
T_CN = 32° C.   T_NI = 42° C.

(f) C₅H₁₁—⟨◯⟩—⟨◯⟩—CO—⟨◯⟩(NC)—C₇H₁₅   and other biphenyl ester liquid crystals;
                   ‖
                   O
T_CN = 45° C.   T_NI = 101° C.

(g) C₅H₁₁—⟨H⟩—⟨◯⟩—CO—⟨H⟩—C₃H₇   and other phenylcyclohexane ester liquid crystals;
                    ‖
                    O
T_CN = 67° C.   T_NI = 154° C.

(h) C₃H₇—⟨H⟩—⟨◯⟩—CO—⟨◯⟩(CN)—C₄H₉   and other phenylcyclohexane ester liquid crystals;
                    ‖
                    O
T_CN = 56° C.   T_NI = 113° C.

(i) C₃H₇—⟨H⟩—⟨◯⟩—OC₂H₅   and other phenylcyclohexane liquid crystals;
T_CN = 41° C.   T_NI = (37° C.) monotropic (j) C₄H₉—⟨H⟩—CO—⟨◯⟩—OC₂H₅   and other cyclohexane ester liquid crystals.
            ‖
            O
T_CN = 37° C.   T_NI = 75° C.

The liquid crystal may be either a mixture of liquid crystals belonging to one of the aforesaid groups, or a mixture of liquid crystals selected from two or more groups. It is also possible to use a mixture of liquid crystals other than shown above if it has negative dielectric anisotropy. Among others, it is preferable to use a mixed liquid crystal mainly consisting of Schiff's base liquid crystal materials.

Moreover, it is possible to incorporate a minor quantity of an optically active substance such as cholesteryl nonanoate and

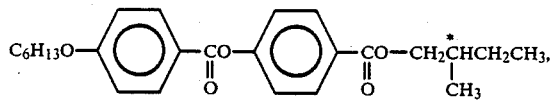

C₆H₁₃O—⟨◯⟩—CO—⟨◯⟩—CO—CH₂C*HCH₂CH₃,
            ‖          ‖         |
            O          O        CH₃ or other additives in order to improve various properties of the liquid crystal layer.

A variety of quaternary ammonium compounds known in the art may be suitable for use as the dopant in the liquid crystal display device of this invention. As according to this invention, the dopant is incorporated in a larger quantity than has been the case in the prior art, it is better to use salts of organic acids as specifically shown below by way of example than salts of strong acids such as (C₄H₉)₄N⁺Br⁻, since the former salts are less likely to influence the decomposition of the liquid crystal molecules.

Examples of particularly suitable quaternary ammonium compounds include the following:

(a) Tetrabutylammonium salt of benzoic acid

⟨◯⟩—COO⁻N⁺(C₄H₉)₄

(b) Tetrabutylammonium salt of p-nitrobenzoic acid

NO₂—⟨◯⟩—COO⁻N⁺(C₄H₉)₄

(c) Tetrabutylammonium salt of p-chlorobenzal-p'-aminobenzoic acid

Cl—⟨◯⟩—CH=N—⟨◯⟩—COO⁻N⁺(C₄H₉)₄

(d) Tetrabutylammonium salt of p-carboxybenzolamino-p'-chlorobenzene

Cl—⟨◯⟩—N=CH—⟨◯⟩—COO⁻N⁺(C₄H₉)₄

(e) Tetrabutylammonium salt of terephthalic acid

4(H₉C₄)N⁺OOC—⟨◯⟩—COO⁻N⁺(C₄H₉)₄

(f) Tetrabutylammonium salt of 3,5-dinitrobenzoic acid (NO₂)₂—⟨◯⟩—COO⁻N⁺(C₄H₉)₄

(g) Tetrabutylammonium salt of p-butoxybenzoic acid

C₄H₉O—⟨◯⟩—COO⁻N⁺(C₄H₉)₄

(h) Tetrahexylammonium salt of benzoic acid

⟨◯⟩—COO⁻N⁺(C₆H₁₃)₄

Various other compounds may be used as the dopant if they are satisfactory in solubility, electrical and electrochemical stability, freedom from any damage to the liquid crystal, durability, and other factors.

According to another feature of this invention, the insulating layers 9 are treated with an alkoxysilane coupling agent containing a glycidoxy group for the orientation of the liquid crystal molecules. According to this invention, the dopant is incorporated into the liquid crystal layer in the quantity corresponding to a specific range of the cut-off frequency $f_c$ as hereinbefore described, and which is considerably, or usually at least 10 times larger than that which has hitherto been employed in a portable electronic calculator, or the like. It is necessary to reduce the thickness of the insulating layers as far as possible, since if they are too thick, a drop in voltage is so sharp that the device fails to respond properly to any voltage in the lower frequency range. It is, therefore, suitable to use thin insulating layers treated with an agent for orientation.

The inventors of this invention have, however, experimentally discovered that in the event a large quantity of dopant is incorporated as hereinabove mentioned, the use of any thin insulating layer treated with any known agent for orientation is likely to have an adverse effect on the orientation of a liquid crystal. The results of experiments repeated by the inventors have indicated that the satisfactory orientation of a liquid crystal can be obtained if an alkoxysilane coupling agent containing a glycidoxy group is used for treating the insulating layers.

According to this invention, those surfaces of the insulating layers which contact the liquid crystal composition are treated with an alkoxysilane coupling agent for the orientation of the liquid crystal. As the coupling agent, it is suitable to use a compound of formula (I):

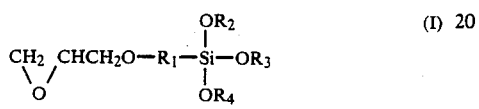

in which $R_1$ stands for an alkylene group having 1 to 5 carbon atoms, and $R_2$, $R_3$ and $R_4$ each stand for an alkyl group having 1 to 3 carbon atoms. Specific examples of the compounds of formula (I) include glycidoxymethyltrimethoxysilane, glycidoxyethyltrimethoxysilane, glycidoxypropyltrimethoxysilane, glycidoxybutyltrimethoxysilane, glycidoxypentyltrimethoxysilane, and the corresponding ethoxysilane and propoxysilane compounds. It is particularly preferable to use γ-glycidoxypropyltrimethoxysilane.

The orientation treatment of the insulating layers may be accomplished by a method which comprises disssolving an alkoxysilane coupling agent containing a glycidoxy group in a solvent, coating the resulting solution on the surface of each electrode substrate carrying an insulating layer thereon, drying the solution, and rubbing the coated surface. In order to ensure formation of a sufficiently thin treated film, it is advisable to add after the rubbing of the coated surface the step of washing the surface with an easily volatile solvent such as acetone, followed by additional rubbing. The orientation treatment of the insulating layers has been found more desirable when repeated more than once than when finished only once, in order to provide highly reliable and satisfactory orientation over a wider surface area.

The insulating layers may, for example, be formed from a film of $SiO_2$, or a high molecular resin. It is preferable to form a film of $SiO_2$ having a thickness of about 100 Å on the surface of each substrate by evaporation.

The solution of the coupling agent may be prepared by using any solvent of the type which can dissolve the agent, and has a boiling point below 80° C. at atmospheric pressure. No solvent having a boiling point above 80° C. at atmospheric pressure, such as water, is suitable, since the glass substrates tend to remain wet, and easily catch any dust from a polishing cloth used for rubbing the surface treated with the agent. Methyl and ethyl alcohols are particularly suitable for use as the solvent, since they have a low boiling point, and dry quickly.

In order to ensure proper orientation, it is preferable that the solution with which the insulating layers are coated have a concentration which is usually higher than 0.01% by weight, but lower than 5% by weight.

The solution may be applied by various methods, including mainly spinning, dipping, offset printing, roll coating and brush coating, and sometimes by using ultrasonic waves. The coated film may be dried and rubbed by a customary method.

The film of the coupling agent per se may have a thickness which is equal to that of a layer composed of one to three molecules of the agent, and is virtually negligible as compared with the thickness of each insulating layer which is about 100 Å as hereinbefore mentioned. Therefore, the coupling agent can accomplish any desired orientation treatment without bring about any substantial increase in the thickness of the insulating layers.

The substrates thus treated are combined with each other, printed with a sealing agent and a conductive paste in a customary manner, and after the sealing agent has been cured, the liquid crystal containing the dopant is injected into the space between the substrates and the space is closed to form a liquid crystall cell which may be used for the manufacture of a liquid crystal display device according to this invention.

The orientation-treated insulating layers in the liquid crystal display device of this invention are extremely small in thickness as compared with any known PVA or $SiO_2$ layer serving both for insulation and orientation, and can, therefore, show a proper response to any voltage in a lower frequency range. The orientation obtained by the treatment as hereinabove described is superior to what may be obtained by the treatment utilizing any known silane coupling agent containing no glycidoxy group.

The liquid crystal layer in the liquid crystal display device of this invention contains such a specific quantity of dopant that is suitable for the display of an image. Accordingly, this invention provides a means which ensures realization of highly reliable and satisfactory orientation with high reproducibility without exerting any adverse effect on the response of a DTN cell to any voltage in a lower frequency range when displaying an image signal with a wide frequency distribution from a low to a high range, and which is effective for the formation of an image which is satisfactory in contrast and halftone. The device of this invention is particularly useful in the display of a TV picture by commercial TV broadcasting. While the frame frequency ($F_{TV}$) of commercial TV broadcasting is 30 Hz, the frame frequency of the liquid crystal display device according to this invention is usually twice higher than $F_{TV}$, or 60 Hz in order to ensure that a display be free from any flicker.

The invention will now be described more specifically by way of example.

The liquid crystal materials shown in TABLE 1 were used by way of example. The composition fully satisfy the cut-off frequency of at least 30 kHz required when a matrix display device having a frame frequency of 60 Hz, and including row electrodes centrally divided into an upper and a lower group by 120 scanning lines is driven in accordance with a voltage equalization method, when the driving voltage has a frequency range of mainly from 60 Hz to 7.2 kHz.

TABLE 1

| Liquid crystal composition: | | |
|---|---|---|
| Liquid crystal | p-methoxybenzylidene- | 45 wt. % |

TABLE 1-continued

| materials | p'-n-butylaniline p-ethoxybenzylidene- p'-n-butylaniline | 45 wt. % |
| --- | --- | --- |
| (Additives) | 1-cyano-1-(p-ethoxyphenyl)-[(1)] 2-(p-hexyloxyphenyl)ethylene | 9.82 wt. % |
|  | Cholesteryl nonanoate | 0.18 wt. % |
| Dopant: | Tetrabutylammonium-3,5-[(2)] dinitrobenzoate | 0.75 wt. % of the liquid crystal materials |

Note:

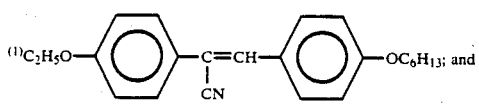

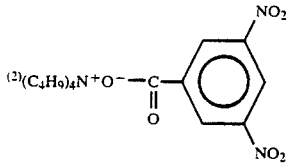

If a DTN prepared from the liquid crystal composition is treated with a known orientation agent, the aforementioned problems arise in the liquid crystal orientation and response to the voltage in a lower frequency range. TABLE 2 shows by way of example agents customarily used for orientation of azoxy, biphenyl and Schiff's base liquid crystals, and the results of the orientation obtained in a customary manner. The layers of PVA and SiO$_2$ also served as insulating layers, while the other agents were each applied onto an insulating layer of SiO$_2$ having a thickness of about 100 Å.

TABLE 2

| Orientation agent | Molecular structure | Concentration (in water) | Film thickness | Orientation |
| --- | --- | --- | --- | --- |
| PVA* (Tokyo Chemical Industrial Co., Ltd.) | $+CH-CH_2+_n$<br>$\mid$<br>OH | 1 wt. % | Up to 1,000Å (applied by dipping) | o |
| SiO$_2$* (applied by electron beam deposition) | — | — | Up to 1,000Å | Δ |
| SH6020 (Toray Silicone Co., Ltd.) | H$_2$NCH$_2$CH$_2$NHCH$_2$—CH$_2$CH$_2$Si(OCH$_3$)$_3$ | 0.01 wt. % | — (applied by dipping) | x |
| SH6070 (Toray Silicone Co., Ltd.) | CH$_3$Si(OCH$_3$)$_3$ | 0.1 wt. % | — (applied by dipping) | x |

Note:
*The threshold voltage at 60 Hz is at least twicr higher than at a frequency of 1 kHz not influenced by the cut-off frequency.

The concentration of each agent and the film thickness obtained thereby were adjusted to those levels at which satisfactory orientation of liquid crystals had been obtained in the prior art. The evaluation of orientation was performed by observation under a parallel nicol microscope of the cells in which the surfaces of the agent layers had been rubbed. The symbols used in TABLE 2 for showing the results of such evaluation are defined as follows:

o (good)—Complete extinction;
Δ (fair)—Partial extinction (partially random orientation);
x (bad)—No extinction at all (completely random orientation).

As is obvious from TABLE 2, the treatment of the cells with a silane coupling agent such as SH6020 and SH6070 fails to provide any satisfactory orientation. The use of PVA and SiO$_2$ is also unsatisfactory, since the great film thickness results in the lack of proper response to any voltage in a lower frequency range because of a sharp drop in voltage. It is, thus, noted that none of these agents is suitable for the orientation treatment of DTN cells.

Attention is now directed to the agent and method employed for orientation according to this invention. The silane coupling agent used as the agent for orientation was γ-glycidoxypropyltrimethoxysilane having the molecular structure shown as

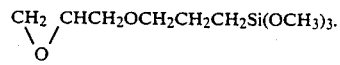

Water and alcohols were used as the solvent. The results of the orientation obtained are shown in TABLES 3 and 4, respectively.

TABLE 3

| Orientation agent | Concentration (Solvent: Water) | Orientation |
| --- | --- | --- |
| SH6040 (Toray Silicone Co., Ltd.) | 0.01 wt. % | x |
| Molecular structure: CH$_2$ CH—<br>\\ /<br>O<br>CH$_2$OCH$_2$CH$_2$CH$_2$Si—(OCH$_3$)$_3$ | 1 wt. %* | Δ |
|  | 5 wt. % | x |
| (Applied onto an insulating layer of SiO$_2$ having a thickness of about 100Å) | | |

Note:
*The threshold voltage at 60 Hz is equal to that at a frequency of 1 kHz not influenced by the cut-off frequency.

TABLE 4

| Orientation agent and concentration | Solvent C$_n$H$_{2n+1}$OH | Orientation |
| --- | --- | --- |
| SH6040 (Toray Silicone Co., Ltd.) | n = 1 (methyl alcohol) | o |
| 1 wt. % | n = 2 (ethyl alcohol) | o |
| Molecular structure: | n = 3 | x |
| CH$_2$ CHCH$_2$OCH$_2$CH$_2$CH$_2$Si(OCH$_3$)$_3$<br>\\ /<br>O | n = 4 | x |

As is obvious from these tables, the use of the silane coupling agent at a concentration which was higher than 0.01% by weight, but lower than 5% by weight provided better orientation that what was obtained by using the silane coupling agents shown in TABLE 2. As the thickness of the film formed by the silane coupling agent shown in TABLES 3 and 4 was extremely small as compared with those of the PVA and $SiO_2$ films, there could be obtained satisfactory response to even any voltage in a lower frequency range. TABLES 3 and 4 also indicate that it is more desirable to use methyl or ethyl alcohol having a boiling point below 80° C. than water as the solvent.

The method of preparing a liquid crystal cell according to this invention will now be described specifically by way of example.

A pair of float glass plates having a thickness of 2 mm, and formed thereon with an ITO electrode assembly in a specific pattern and an insulating layer of $SiO_2$ having a thickness of 100 Å were dipped for five minutes in a 1 wt.% methyl alcohol solution of SH6040 (Toray Silicone Co., Ltd.) while ultrasonic waves were being applied to the solution. After the glass substrates were dried at 80° C. for an hour, their surfaces were rubbed by polishing cloth, followed by the washing of the glass substrates in an acetone solution, and drying. These procedures were repeated again. Then, glass fibers having a diameter of 6 μm were scattered on one of the glass substrates, and a heat sealing agent, Diamide Film 7000 of DICEL CHEMICAL INDUSTRIES LTD., was applied thereto, whereby a liquid crystal cell was formed. Then, the cell was filled by vacuum injection with the liquid crystal composition prepared so as to satisfy the driving conditions, followed by the closure of the injection port with In, whereby a DTN cell was prepared.

There were, thus, obtained a liquid crystal cell having extremely thin insulating layers treated for orientation, and which was excellent in response and orientation, and a liquid crystal display device including such a liquid crystall cell. The display device thus obtained could produce a display of a TV picture which was satisfactory in contrast and halftone.

What is claimed is:

1. A matrix liquid crystal display device for video image using depolarization in twisted-nematic mode comprising a pair of transparent substrates defining a pair of mutually facing surfaces, transparent electrodes provided on each of said mutually facing surfaces, an insulating layer with orienting property formed on said electrodeds on each of said surfaces, a liquid crystal layer formed by depolarization in a twisted-nematic layer, said liquid crystal being nematic with a negative dielectric anisotropy, and disposed between said mutually facing insulating layers, and a polarizer provided on the opposite surface of each of said substrates from said liquid crystal layer, and the liquid crystal layer contains an ionic dopant such that the cut-off frequency $f_c$ (Hz) of said liquid crystal layer satisfies the following relationship within a range of ambient temperatures:

$$16 \cdot C/C_o \cdot N \cdot F \geq f_c \geq 8 \cdot N \cdot F$$

in which N stands for the number of multiplex driving, F stands for the frame frequency of an image signal, C stands for the capacitance per unit area of said insulating layers, and $C_o$ stands for the capacitance per unit area of said insulating layers when they have a specific dielectric constant of about 4, and a thickness of about 100 Å, where the $f_c$ value of the device is at least about 29 KHz and such that the reproduction of a video image with a half-tone is achieved, said insulating layers are treated with an alkoxysilane coupling agent containing a glycidoxy group.

2. A liquid crystal display device as set forth in claim 1, wherein said frame frequency F is 60 Hz, so that said device may be used for the display of a TV picture by commercial TV broadcasting with a frame frequency $F_{TV}$ of 30 Hz.

3. A device as set forth in claim 2, wherein said insulating layers have a thickness of about 100 Å and a specific dielectric constant ε of about 4, said frame frequency F is 60 Hz, and said liquid-crystal layer contains said dopant to the extent that said cut-off frequency $f_c$ satisfies the following relationship:

$$960N \geq f_c \geq 480N$$

so that said device may be used for the display of a TV picture by commercial TV broadcasting at a frame frequency of $F_{TV}$ of 30 Hz.

4. A liquid crystal display device as set forth in claims 1 or 2, wherein said alkoxysilane coupling agent comprises a compound represented by formula (I):

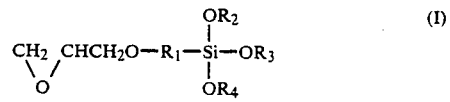

in which $R_1$ stands for an alkylene group having 1 to 5 carbon atoms, and $R_2$, $R_3$ and $R_4$ each stand for an alkyl group having 1 to 3 carbon atoms.

5. A liquid crystal display device as set forth in claim 4, wherein said compound is γ-glycidoxypropyltrimethoxysilane.

6. A liquid crystal display device as set forth in claim 5 wherein said alkoxysilane coupling agent is applied in the form of a solution in a solvent having a boiling point below 80° C. at atmospheric pressure.

7. A liquid crystal display device as set forth in claim 6, wherein said solution contains more than 0.01% by weight, but less than 5% by weight, of said coupling agent.

8. A liquid crystal display device as set forth in claim 7, wherein said solvent is selected from the group consisting of methyl alcohol and ethyl alcohol.

9. A liquid crystal display device as set forth in claim 1, wherein said liquid crystal layer comprises a Schiff's base liquid crystal composition.

10. A liquid crystal display device as set forth in claim 1, wherein each of said insulating layers comprises a film of $SiO_2$ having a thickness of about 100 Å.

11. A device as set forth in claim 1, wherein said dopant comprises a quaternary ammonium compound.

12. A device as set forth in claim 11, wherein said dopant comprises tetrabutylammonium-3-5-dinitrobenzoate.

13. A device as set forth in claim 1, wherein said liquid-crystal layer has a thickness of $7\mu \pm 1 \mu$.

14. A device as set forth in claim 1, wherein $f_c$ is in the range of from about 29 to about 58 kHz.

* * * * *

UNITED STATES PATENT AND TRADEMARK OFFICE
CERTIFICATE OF CORRECTION

PATENT NO.  : 4,553,821
DATED       : Nov. 19, 1985
INVENTOR(S) : Yutaka Ishii, et al.

It is certified that error appears in the above-identified patent and that said Letters Patent is hereby corrected as shown below:

Title page, item [22]: "Feb. 10, 1985" should read
--Feb. 10, 1981--

Title page, item [75]: "Wada Tomio" should read --Tomio Wada--

Column 9, line 51: after "least", "twicr" should read
--twice--

Column 11, line 41: after "liquid", "crystall" should read
--crystal--.

Signed and Sealed this

Sixteenth Day of September 1986

[SEAL]

Attest:

DONALD J. QUIGG

Attesting Officer

Commissioner of Patents and Trademarks